March 12, 1963     S. R. RICH     3,080,752

CONTINUOUS LEVEL MEASURING APPARATUS

Filed June 30, 1958

INVENTOR.
STANLEY R. RICH
ATTORNEY

United States Patent Office 3,080,752
Patented Mar. 12, 1963

3,080,752
CONTINUOUS LEVEL MEASURING APPARATUS
Stanley R. Rich, West Hartford, Conn., assignor, by mesne assignments, to Acoustica Associates, Inc., Beverly Hills, Calif., a corporation of New York
Filed June 30, 1958, Ser. No. 745,712
23 Claims. (Cl. 73—290)

This invention relates to the measurement of distances to liquid surfaces from a reference point or region, and more particularly to liquid depth and distance measuring systems which can function independently of conditions existing in the liquid under measurement.

Existing systems for measuring depths of liquids and/or distances to surfaces of liquid bodies depend, as far as I am aware, upon some characteristic of the liquid in such a manner that the characteristic enters into the accuracy of the measurement. Thus, for example, systems which transmit a pulse of compressional wave energy through a liquid to measure its depth must be calibrated for the velocity of such energy in the particular liquid under a particular set of conditions, and readings which are accurate for one liquid will not necessarily be accurate for another liquid, or even for the same liquid with different materials in solution, different solution concentrations, or different temperature or pressure. Or, systems which depend upon reflection of wave energy from a liquid surface depend upon the nature of the surface; a sharp interface at the surface of a liquid which has an acoustical impedance differing sharply from that of the adjacent medium is usually required. By contrast, a system according to the present invention will measure accurately the distance to the surface of, and the depth in, any liquid, independently of any characteristic of the liquid or the surrounding medium. The liquid needs merely to be present to be measured accurately by the same apparatus without any special calibration to provide accurate measurements under all conditions.

According to this invention, elastic wave energy in one or more rods, tubes or other elongated structures supported or mounted to extend from a point or region outside the liquid into the liquid, preferably in a vertical direction, is employed to provide the desired measurement. Desirably, a short pulse of either compressional, torsional or transverse ultrasonic wave energy is introduced at the top of one of the rods, above the liquid surface, as by an electromechanical transducer. This pulse travels down the rod at a velocity characteristic of the particular solid of which the rod is constructed. When the pulse reaches the liquid surface boundary, compressional wave energy is propagated in the liquid. This will be due to Poisson's coupling when compressional waves are being propagated in the rod. It will be direct compressional wave radiation when torsional or transverse waves are being propagated in the rod. The resulting compressional wave energy in the liquid travels in all directions, and some of it arrives at a second, and possibly a third, additional rod or rods, near the first, preferably parallel to it and, like it, partly immersed in the liquid. Compressional wave energy entering the second and the possible third rod or rods in the liquid travels toward both ends, that is up, to the top, and down, to the bottom. The tops of the second, and possible third, rods are supplied with means, for example electromechanical transducers, to indicate the arrival thereat of elastic wave pulses. We thus have a system in which an elastic wave pulse originating at the top of a first rod travels down the rod to the liquid surface, through the liquid a distance which can be very short, and up a second, and possibly a third, rod to the top thereof. As will be made clear, the time of propagation of elastic wave energy in this system is inherently substantially independent of the nature of the liquid and conditions in it, and of conditions in its vicinity, and a system based on this arrangement can be provided which will be completely independent of all such factors.

In its basic aspect, the invention proposes a system which measures the time taken for a short elastic wave energy pulse to travel between a transmitter and a receiver over a path through a known material, the length of which is determined by contact of that material with a surface of a liquid being observed. The measurement may be accomplished by circuits such as that shown and described in my U.S. Patent No. 2,706,906 dated April 26, 1955. Such circuits form no part of the present invention, which is concerned rather with the provision of paths of travel for the measuring energy which are essentially entirely in a known material and are not affected by characteristics of the liquid under observation, as well as improvements for removing entirely any small effects of the liquid under observation which may be present.

My invention will be better understood from the following description of a few embodiments. The description refers to the accompanying drawing, wherein.

Figure 1:
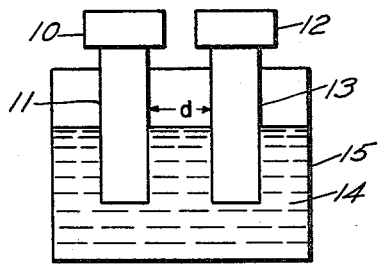
FIG. 1 illustrates an embodiment of the invention employing two parallel rods closely adjacent each other.
Figure 5:
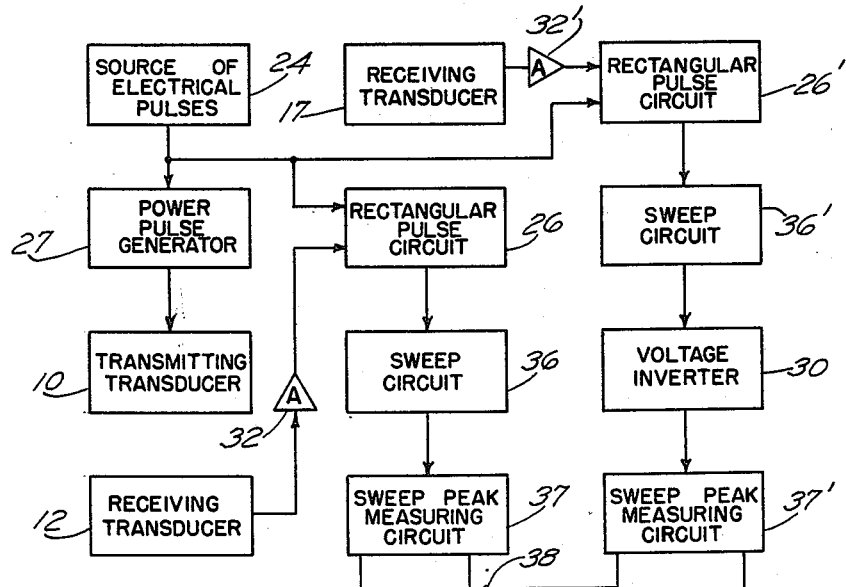
FIG. 5 illustrates a circuit, which may be employed with the arrangement of FIG. 4, automatically to cancel out of the measurements any factor due to the characteristics of the liquid under observation.

Referring to FIG. 1, a rod 11, vertically disposed and partially immersed in a liquid 14 which in turn is held in a container 15, is fitted at its upper end with an electromechanical transducer 10; this is the transmitter, and in practice it would be supplied with an electrical pulse of suitable characteristics from a pulse wave source (not shown). A short distance away from the rod 11 is a second rod 13, parallel to the first rod 11, and also partially immersed in the liquid 14. The second rod 13 is fitted at its upper end with a second electromechanical transducer 12; this is the receiving transducer. In practice, the transmitting and receiving transducers 10 and 12 will be connected to an arrangement for indicating the shortest time taken for an elastic wave pulse to travel between them through the rods 11 and 13 and the liquid 14. The circuit which is shown and described in my above-mentioned Patent No. 2,706,906 is precisely such a circuit, in which the transmitting transducer 28 and the receiving transducer 31 are, respectively, equivalent to the transmitting transducer 10 and the receiving transducer 12 of FIG. 1 of the present application. While no time-measuring circuit is shown or described in FIG. 1, such a circuit is shown in FIG. 5. Of course, other time measuring means may be used by those skilled in the art.

If the transmitting transducer 10 introduces a compressional wave pulse into the first rod 11, the pulse will travel down the rod toward its lower end. As the compressional wave progresses, it will be accompanied by a radially-directed expansion-and-contraction in the rod, due to the well-known Poisson's ratio. Upon this radially directed wave reaching the liquid 14, it will introduce radially-directed compressional waves into the liquid. These waves will travel radially in all directions, exactly as do waves generated by a stone dropped in a pond. The wave front will reach the second rod 13 and introduce a radially-directed compressional wave into it. This wave will in turn travel toward both ends of the second rod 13, and the component which travels toward the upper end will reach the receiving transducer 13. In the receiving transducer, it will generate a corresponding electrical pulse, which will resemble the electrical pulse originally supplied to the transmitting transducer 10, but will be smaller in magnitude as will be presently discussed.

As will be recognized, not all of the compressional wave energy introduced into the first rod 11 will pass into the liquid 14 when the pulse reaches the liquid. Some of this energy will proceed to the lower end, and some will be coupled out along the part of the rod which is immersed in the liquid. Further, by reflection from the lower end, additional energy, proceeding back up the first rod 11 will be coupled out in the same manner. However, the first energy to be coupled out is that which first reaches the liquid 14 from the transmitting transducer 10, namely that which first arrives at the surface of the liquid. It is obviously not possible for any of the energy to be coupled into the liquid until the energy reaches the liquid. Thus, the first energy to reach the second rod 13 is the first energy to reach the liquid from the transmitting transducer 10, and the time for this to happen is determined by the length of the first rod 11 between the transmitting transducer 10 and the surface of the liquid, and the distance "$d$" between the two rods 11 and 13. Since this distance "$d$" is constant, the time for the pulse from the transmitting transducer 10 to reach the second rod 13 is determined solely by the distance from the transmitting transducer 10 to the surface of the liquid 14, through the first rod 11.

Obviously, it is not material that the second rod 13 be the same length as the first rod 11, but if it is, and the rod materials and structures are the same, the time required for the first energy to reach the receiving transducer 12 from the transmitting transducer 10 will be twice the time taken for that energy to reach the surface of the liquid 14 from the transmitting transducer 10, plus the time to travel the distance "$d$" in the liquid 14. As will be recognized from the foregoing discussion, additional elastic wave energy will reach the receiving transducer 12 after the first energy, but if a time measuring system is employed which responds only to, or separates for observation, the first-arrival energy, the later-arriving energy can have no effect on the measurement. The measuring circuit of my Patent No. 2,706,906 has this property. The advantage of the system of the present invention, which will be readily appreciated from the foregoing discussion of the embodiment of FIG. 1, lies in the fact that the time of propagation of elastic wave energy, whether compressional, transverse or torsional, in solid structures (especially metals) is substantially constant, and independent of temperature and pressure to a vastly greater extent than in liquids. In some metals, velocity of elastic waves is truly independent of temperature over wide temperature ranges. The time of propagation of elastic waves across the very short liquid path ("$d$") will be, in general, small compared with the time of propagation in the rods 11 and 13. Therefore, any error or change in time of propagation across the liquid as a coupling medium will be a much smaller percent error than if the elastic wave energy were introduced at the bottom of a tank or top of a liquid body and echoes were reflected from the top or bottom, as the case may be.

Figure 2:
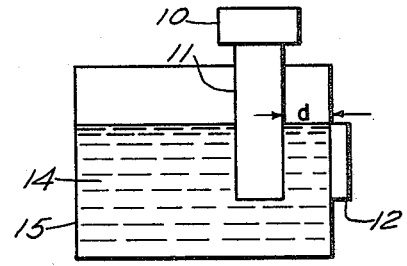
FIG. 2 illustrates the invention practised with only one rod and a wave receiver coupled to the liquid through a side of its container.

While the use of two rods 11 and 13 in FIG. 1 tends to reduce the percentage of the elastic wave energy path which is supplied by the liquid under observation, reliable measurements can be had if only one rod is used. FIG. 2 illustrates one such embodiment of the invention. In FIG. 2, the tank 15 contains the liquid 14 in which only the first rod 11 is provided, but located close to one side of the tank. The receiving transducer 12 is affixed to that side of the tank nearest the rod 11, and the transmitting transducer is fitted to the upper end of the rod 11, as in FIG. 1. The path of travel for the elastic wave energy from the transmitting transducer 10 to the receiving transducer 12 is now the length of the rod 11 between the transmitting transducer 10 and the surface of the liquid 14, and the distance "$d$" across the liquid to the receiving transducer 12. Again, the distance "$d$" is a constant for all depths of the liquid 14, due to parallelism between the wall of the tank 15 and the rod 11, so that the only variable with liquid depth is the length of the rod 11 between the transducer 10 and the surface of the liquid 14.

Figure 3:
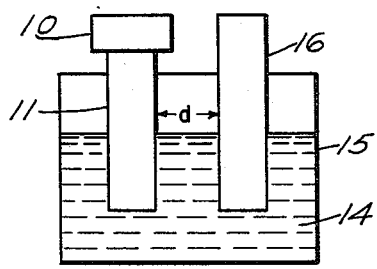
FIG. 3 illustrates an embodiment employing an elongated transducer.

There may be cases where it is not practical to attempt to maintain the liquid path distance "$d$" constant with an arrangement according to FIG. 2. In such cases, if a two-rod arrangement like that of FIG. 1 is not desired, the arrangement of FIG. 3 is available. In FIG. 3 the first rod 11, having at its upper end the transmitter 10 is retained. The receiving transducer 16 is itself elongated, in the form of a rod for example, and is maintained parallel to the rod 11 and a distance "$d$" from it. The receiving transducer 16 may for example be a barium-titanate rod, or a magnetostrictive rod or a tube with a wire in it—these are all well-known forms of electromechanical transducers. In such a case, as in FIG. 2, the first-arrival energy from the transmitting transducer 10 traverse an elastic wave path made up only of the distance in the rod 11 from the transmitting transducer to the surface of the liquid 14, and the distance "$d$" in the liquid. Immediately upon reaching the rod-shape transducer 16 the elastic wave energy is converted to the electrical energy.

Figure 4:
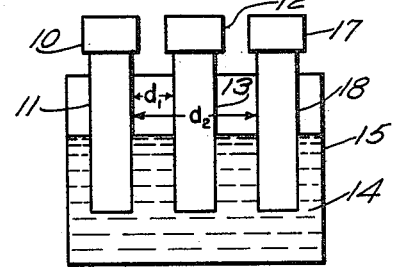
FIG. 4 illustrates an embodiment employing three rods, each having its own transducer.

A refinement of the technique illustrated in FIGS. 1, 2 and 3, is shown in FIG. 4. Here the transmitting rod 11 with transmitting transducer 10, and the receiving rod 13 with receiving transducer 12, are provided, the rods being partially immersed in the liquid 14, in a tank 15, all as in FIG. 1. In addition, a second receiving rod 18, with a second receiving transducer 17 fitted at its upper end, is provided. All three rods are parallel to each other. The second receiving rod 18 is spaced a different distance from the transmitting rod 11 than the first receiving rod 13; it is convenient to choose a distance ratio of 2:1, for the purposes of this discussion, so that in FIG. 4 "$d_2$" is twice "$d_1$." The three rods are preferably not arrayed in a straight line, as they would appear to be in FIG. 4, in order to provide a clear path to each receiving rod from the transmitting rod. In fact, if the three rods are arrayed in a straight line, the transmitting rod should be located between the two receiving rods.

For a 2:1 spacing ($d_2=2d_1$), the time of propagation of elastic waves from the transmitting rod 11 to the first receiving rod 13 through the liquid itself will be eactly half the time of propagation of elastic waves from the transmitting rod to the second receiving rod 18, through the liquid itself, and this ratio will exist regardless of variations of conditions in the liquid. These two times can be subtracted from one another or in any case computed out so that the factor due to time of propagation across the liquid can be made to vanish from the distance or depth computation, leaving as a final result, time of propagation of elastic waves in the rods alone. This latter time is, of course, related only to the velocity of elastic wave energy in the rod material, which if a metal, as is preferable, can be substantially independent of temperature and pressure. This independence is a valuable characteristics of the invention for many industrial purposes.

A simple and continuous computer for use with the embodiment of FIG. 4, to cancel out the factor due to time of propagation across the liquid, is illustrated in FIG. 5. In this computer, the following assumptions and definitions apply:

(1) $d_2=2d_1$;

(2) The velocity of elastic waves in the rods is V$m$, and the length of each rod above the liquid is L$m$;
(3) The total transmission time from the transmitting transducer 10 to the first receiving transducer 12 is ($T_1$), and to the second receiving transducer it is ($T_2$).
(4) V$l$ is the velocity of propagation of elastic wave energy in the liquid medium.

Thus:

$$T_1 = \frac{Lm}{Vm} + \frac{d_1}{Vl} + \frac{Lm}{Vm} \qquad \text{(Relation 1)}$$

$$T_2 = \frac{Lm}{Vm} + \frac{2d_1}{Vl} + \frac{Lm}{Vm} \qquad \text{(Relation 2)}$$

$$T_2 - T_1 = \frac{d_1}{Vl} \qquad \text{(Relation 3)}$$

$$T_1 - (T_2 - T_1) = 2T_1 - T_2 = \frac{2Lm}{Vm}$$

$$\text{(Relation 4)}$$

that is, if we subtract the difference between $T_1$ and $T_2$ from $T_1$ itself, we have a quantity which is precisely the measurement desired, independent of $d_1$ and $d_2$ and of V$l$. The circuit of FIG. 5 does this automatically.

The times $T_1$ and $T_2$ are easily measured by a variety of means, such as the system of my patent identified above. In FIG. 5 a source of electrical pulses drives a power pulse generator 27 and at the same time starts two rectangular pulse circuits 26 and 26'. The power pulse generator applies an energizing pulse to the transmitting transducer 10. The first receiving transducer 12 stops the first rectangular pulse circuit 26 through an amplifier 32. A first sweep circuit 36 generates a voltage rising in the positive-going direction linearly with time. This circuit is started and stopped by the first rectangular pulse. A sweep peak measuring circuit 37 measures the highest voltage reached by the sweep voltage. The blocks 27, 26, 36 and 37 and the amplifier 32 will be recognized as the blocks and amplifier bearing the same reference characters in FIG. 1 of my Patent No. 2,706,906, and their functions as outlined above are fully explained in the patent. The source of electrical pulses 24 is represented in FIG. 1 of the patent by blocks 10 and 11 and the internal calibration dividers ending with block 24. For purpose of the present description, it is material only to identify those elements of the patent as a source of pulses applied to the power pulse generator 27 and the rectangular pulse circuit 26. The voltage in the sweep peak measuring circuit 37 is proportional to the time duration, of the rectangular pulse generator by the first rectangular pulse circuit 26, and therefore to the time $2T_1$. This voltage has a positive sign.

The second receiving transducer 17 stops the second rectangular pulse circuit 26', which through a sweep circuit 36' and sweep peak measuring circuit 37' generates a voltage proportional to time $2T_2$. The sense of this voltage is desired to be negative so, if the sweep circuit 36' itself is not designed to provide a negative-going voltage, a voltage inverter 30 can be inserted.

To measure the quantity $2T_1 - T_2$, as desired according to Relation 4, a voltage divider comprising two equal-valued resistors $R_d$ and $R_d$ in series is connected across the output ($-2T_2$) of the second sweep peak measuring circuit 37'. A third resistor $R_A$ is connected across the output ($+2T_1$) of the first sweep peak measuring circuit 37. The two outputs have a common neutral 38, to which the junction of $R_A$ And The Divider $R_D$, $R_D$ is connected. A second voltage divider comprising two series-connected resistors $R_B$ and $R_B$ is connected from the positive end of resistor $R_A$ (IE — from ($+2T_1$)) to the mid-point of the first voltage divider, namely the junction of resistors $R_D$ and $R_D$ (i.e. — to ($-T_2$)). The voltage between the injunction 39 of the second divider $R_B$, $R_B$ to the common neutral 38 is proportional to the sum of $+2T_1$ and $-T_2$, or to the expression $2T_1 - T_2$, and therefore to the quantity $$\frac{2Lm}{Vm}$$

This result is true if the assumptions made above are true, and if $R_B \gg R_D$, and if the system load is much greater than $R_B$.

Other forms of computers will solve the expression of Relation 4; the computer shown in FIG. 5 is by way of example only.

It will be appreciated that the portion of FIG. 5 which cooperates with the transmitting transducer 10 and the first receiving transducer, up to and including the first sweep peak measuring circuit 37, will serve to measure the time of travel of the first arrival elastic wave energy in the receiving transducer of FIGS. 1, 2 or 3 when connected as shown in FIG. 5. This arrangement is pointed out by way of example only, as the particular time-measuring means is not part of my present invention, and other time measuring means may be employed if desired.

My invention resides in the methods of measuring which have been illustrated and described, as well as in the apparatus and combinations of that apparatus which have been illustrated and described. I have found that the invention operates as herein described, with accuracy independent or substantially independent of the material being observed, in all kinds of liquid, including bottom residue which measured 12,000 centipoises. Coating of the rod or rods with an asphalt-like substance under observation does not affect the operativeness of the invention, or the accuracy. I have tested the invention in water, oil, rubber latex cement having a high solid content, and even in ketchup, and found that it operates as described, with the accuracy described, herein.

Attenuation in the material under observation has no deleterious effect on performance because so little of the material under observation takes part in the elastic wave path. On the other hand, the factors causing loss of energy from transmitter to receiver are fairly constant, and can be taken into account. I have found that with an 80 volt input pulse to one system I have built employing crystal transmitting and receiving transducers, and two rods (as in FIG. 1) a received signal of ½ volt appeared in the receiving transducer. This is a very small loss, easily compensated for, if desired, by an amplifier as shown in FIG. 5.

What I claim is:

1. System for determining the distance from a reference point which is outside of a fluid body to the surface of the fluid body comprising an elongated metallic member of regular cross section extending from said reference point into the fluid through said surface, an electromechanical transducer coupled to said member to introduce elastic wave energy therein at said region propagating toward said surface, and a second electromechanical transducer located to receive elastic wave energy passing from said member a known distance through said fluid in a direction laterally from said member, said second transducer being spaced said known distance laterally from said member in said direction.

2. System according to claim 1 including means coupled to both of said transducers to measure the shortest time required for elastic wave energy to travel through said member to said fluid and through said known distance of said fluid laterally from said member.

3. System for determining the distance from a reference region which is outside of a fluid body to the surface of the fluid body comprising a pair of parallel straight rods extending side-by-side from said region into said fluid through said surface, said rods spaced a prescribed distance apart at said surface, and an electromechanical transducer coupled to each rod at an end thereof in said region, one of said transducers being adapted to introduce elastic wave energy into the therewith associated rod, the other transducer being adapted to receive elastic wave energy propagating in the therewith associated rod.

4. System according to claim 3 including means coupled to both of said transducers to measure the shortest time required for elastic wave energy to pass from said one of said transducers through the rod coupled thereto to the fluid, through the fluid said prescribed distance to the other rod, and through the other rod to the other transducer.

5. System for determining the distance to a fluid surface from a region which is outside the body of the fluid comprising a pair of rods parallel to each other and arranged side-by-side a prescribed distance apart and an electromechanical transducer coupled to each rod at an end thereof one of said transducers being adapted to introduce elastic wave energy into the therewith associated rod, the other transducer being adapted to receive elastic wave energy propagating in the therewith associated rod, said rods having free ends extending in the same direction away from said transducers, whereby immersion of said free ends in a fluid provides a wave energy path between said transducers which includes a portion in the fluid between said rods which portion is said known distance long.

6. System according to claim 5 including means coupled to both of said transducers to measure the shortest time required for elastic wave energy to travel from said one transducer to the other through said rods and through a wave energy transmitting medium constituted by said portion in a fluid which may be between them when said free ends are immersed in a fluid body.

7. System for determining distances to a fluid surface from a region which is outside the body of the fluid comprising a rod, an electromechanical transducer coupled to said rod at an end thereof, and a second elongated transducer positioned parallel to said rod, said rod and elongated transducer being arranged side-by-side a prescribed distance apart, whereby bridging of said distance with a fluid between the free end of said rod and said elongated transducer provides a wave energy path directed laterally between said elongated transducer and rod which includes a portion in the fluid, which portion is said prescribed distance long.

8. System according to claim 7 including means coupled to both of said transducers to measure the shortest time required for elastic wave energy to travel from the first-named transducer through said rod to the second transducer via the elastic wave transmitting medium constituted by said laterally directed portion in a fluid which may be between said rod and said second transducer.

9. System for determining the distance to a fluid surface from a region which is outside the body of the fluid comprising three parallel rods each having an electromechanical transducer at one end thereof, a first of said transducers being adapted to introduce elastic wave energy into the therewith associated rod, second and third of said transducers being each adapted to receive elastic wave eneregy propagating in the therewith associated rod, said rods being disposed side-by-side prescribed distances apart and having free ends all extending in the same direction away from said transducers, whereby immersion of said free ends in said fluid provides separate wave energy paths between said first and second transducers and between said first and third transducers, respectively, each of which paths includes a portion in the liquid directed laterally between the transducers, which portion is a known distance long.

10. System according to claim 9 including first means to measure the shortest time required for elastic wave energy to travel from said first one of said transducers through the rod coupled thereto to the surface of a fluid which may be between the first and second rods and through such fluid laterally to the second rod and thence through the second rod to said second transducer coupled thereto, and second means to measure the shortest time required for elastic wave energy to travel from said first transducer through the rod coupled thereto to said surface and through such fluid laterally to the third rod and thence through said third rod to said third transducer coupled thereto.

11. System according to claim 10 including means to compare the two shortest times measured by said first and second means in a fashion to eliminate the effects of time taken in each measurement for elastic wave energy to traverse such fluid.

12. System for determining the distance to a fluid surface from a region which is outside the body of the fluid comprising first, second and third rods parallel to each other and arranged side-by-side prescribed distances apart, the first and second rods being spaced twice as far apart as the first and third rods, and first, second and third electromechanical transducers coupled, respectively, to said first, second and third rods at their ends, said first transducer being adapted to introduce elastic wave energy into the rod coupled thereto, said second and third transducers being adapted to receive elastic wave energy propagating in the respective rods coupled to each, said rods having free ends adapted for immersion in a fluid with at least said first rod passing through said surface from said region, whereby each pair of said rods may be bridged by such fluid to provide a fluid path for elastic wave energy and such fluid path between said first and second rods will be twice as long as such fluid path between said first and third rods.

13. System according to claim 12 including first means to measure the shortest time required for elastic wave energy to travel from the first to the second transducer through the first to the surface of second rods and any elastic wave transmitting medium which may be between them via the fluid path between them, and second means to measure the shortest time required for elastic wave energy to travel from the first to the third transducer through the first and third rods to said surface and through such fluid when it is between them.

14. System according to claim 13 including means to provide a measuring quantity proportional to the value $2T_1 - T_2$ where $T_1$ is the shortest time measured by said second means, and $T_2$ is the shortest time measured by said first means.

15. Method for determining the distance from the reference region which is outside of a fluid body to a fluid surface comprising the steps of transmitting elastic wave energy through a continuous elongated solid wave-conductor path extending through the surface of the fluid, thence through a prescribed path in the fluid transversely to said metallic path, detecting said energy at the end of the total path and measuring the shortest time taken for said energy to traverse said total path.

16. Method for determining the distance from the reference region which is outside of a fluid body to a fluid surface comprising the steps of transmitting elastic wave energy through a first prescribed solid path to the surface of the fluid, thence through a first prescribed path in the fluid, detecting said energy at the end of the total of said first paths and measuring the shortest time taken for said energy to traverse said total path, transmitting elastic wave energy through a second prescribed solid path to said surface, thence through a second prescribed path in the fluid which is longer than said first prescribed path in said fluid, detecting said energy at the end of the total of said second paths, and measuring the shortest time taken for said energy to traverse said second total path.

17. Method according to claim 16 comprising the step of comparing said shortest times to provide a measure of the lengths of said prescribed solid paths.

18. System for determining the distance from a reference point which is outside of a fluid body to the surface of the fluid body comprising a continuous elongated solid wave-conductor extending from said reference point into the fluid through said surface and adapted to provide a path for elastic wave energy between said point and said surface, electromechanical transducer means at said point coupled to said path, and second electromechanical transducer means so arranged relative to said conductor that it will be coupled to said conductor by elastic wave energy passing through said fluid laterally with respect to said conductor.

19. System for determining the distance from a reference point which is outside of a fluid body to the surface of the fluid body comprising a continuous elongated solid wave-conductor extending from said reference point into the fluid through said surface and adapted to provide a path for elastic wave energy between said point and said surface, electromechanical transducer means at said point coupled to said path, and second electromechanical transducer means located a known lateral distance from said conductor.

20. System for determining the distance from a reference point which is outside of a fluid body to the surface of the fluid body comprising a continuous elongated wave conductor extending from said reference point into the fluid through said surface and adapted to provide a path for elastic wave energy from said point to said surface, means at said point to introduce elastic wave energy into said wave conductor in a wave mode having a motional component transverse to the axis of said wave conductor, and wave-receiving means responsive to energy of said transverse component passing laterally from said wave conductor through said fluid, said wave receiving means being located a known distance in said fluid from said wave conductor in a lateral direction.

21. System according to claim 20 including means to measure the shortest time required for elastic wave energy to travel from said point through said path and fluid to said wave-receiving means.

22. System according to claim 21 in which said means to measure is adapted to measure the shortest time required for a pulse of elastic wave energy to travel from said point through said path and fluid to said wave-receiving means.

23. In an acoustical gauging apparatus for use in gauging of fluids, relatively rigid means adapted to carry acoustical energy having at least a portion thereof disposed in said fluid, transducer means connected to the acoustical means, transmitting means for impressing electrical oscillations on said transducer means to introduce wave trains in the form of acoustical energy into said acoustical means, receiver means connected to said transducer means for receiving electrical oscillations from said transducer means, and means for measuring the time interval elapsing between the introduction of acoustical energy into the acoustical means and the return of acoustical energy to said transducer means; the acoustical means comprising a pair of acoustic transmitting members above the surface of the fluid, and said transducer means comprising a transducer connected to each of said acoustic transmitting members.

References Cited in the file of this patent

UNITED STATES PATENTS

| | | |
|---|---|---|
| 1,977,875 | Donaldson | Oct. 23, 1934 |
| 2,709,918 | Yetter | June 7, 1955 |
| 2,883,861 | Van Valkenburg et al. | Apr. 28, 1959 |